United States Patent
Zhang

(10) Patent No.: US 10,600,374 B2
(45) Date of Patent: Mar. 24, 2020

(54) DC VOLTAGE CONVERSION CIRCUIT AND LIQUID CRYSTAL DISPLAY DEVICE

(71) Applicant: Shenzhen China Star Optoelectronics Semiconductor Display Technology Co., Ltd., Shenzhen (CN)

(72) Inventor: Xianming Zhang, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 212 days.

(21) Appl. No.: 15/579,934

(22) PCT Filed: Nov. 15, 2017

(86) PCT No.: PCT/CN2017/110994
§ 371 (c)(1),
(2) Date: Dec. 5, 2017

(87) PCT Pub. No.: WO2019/015182
PCT Pub. Date: Jan. 24, 2019

(65) Prior Publication Data
US 2019/0027103 A1    Jan. 24, 2019

(30) Foreign Application Priority Data
Jul. 18, 2017    (CN) .......................... 2017 1 0587339

(51) Int. Cl.
*G09G 3/36* (2006.01)
*G09G 3/20* (2006.01)
*H02M 3/156* (2006.01)

(52) U.S. Cl.
CPC ................ *G09G 3/36* (2013.01); *G09G 3/20* (2013.01); *H02M 3/156* (2013.01); *G09G 2320/0204* (2013.01); *G09G 2330/028* (2013.01)

(58) Field of Classification Search
CPC .... G09G 3/36; G09G 3/20; G09G 2320/0204; G09G 2330/028; H02M 3/156
See application file for complete search history.

(56) References Cited

U.S. PATENT DOCUMENTS 6,583,610 B2    6/2003  Groom
2010/0220049 A1*  9/2010  Murakami ......... H05B 33/0815
                                                    345/102

(Continued)

FOREIGN PATENT DOCUMENTS

CN    101064470 A    10/2007
CN    201127003 Y    10/2008

(Continued)

OTHER PUBLICATIONS

English Translation of CN 204258633 dtd Apr. 8, 2015. (Year: 2015).*
Drawings for CN 204258633 dtd Apr. 8, 2015 (Year: 2015).*

*Primary Examiner* — Patrick N Edouard
*Assistant Examiner* — Eboni N Giles
(74) *Attorney, Agent, or Firm* — Leong C. Lei

(57) ABSTRACT

The present invention provides a DC voltage conversion circuit and a liquid crystal display device. The DC voltage conversion circuit comprises a voltage dividing unit, a voltage conversion unit, a first subtractor, an adder, a second subtractor, and a pulse width modulation unit. The pulse width modulation unit is used for correspondingly adjusting the duty ratio of the pulse signal outputted when a voltage outputted from the output terminal of the second subtractor is smaller than or greater than a preset voltage difference, (Continued)

and the output voltage and the feedback voltage are increased or decreased until the voltage outputted from the second subtractor output is equal to the preset voltage difference. So as to increase the output voltage when the output current of the DC voltage conversion circuit is increased, and reduce the output voltage when the output current is decreased, and can ensure that the voltage received by the connected electrical components is consistent and the quality of the product is improved.

11 Claims, 3 Drawing Sheets

(56) References Cited

U.S. PATENT DOCUMENTS

| | | | |
|---|---|---|---|
| 2013/0328534 A1* | 12/2013 | Hsieh | G05F 3/02 323/271 |
| 2015/0338862 A1* | 11/2015 | Shin | G05F 1/46 323/281 |
| 2016/0233767 A1* | 8/2016 | Sun | H02M 3/158 |
| 2016/0323947 A1* | 11/2016 | Seki | H05B 33/0815 |
| 2017/0117717 A1* | 4/2017 | Pagano | H02J 50/80 |
| 2018/0131275 A1* | 5/2018 | Guan | H02M 3/156 |
| 2018/0183320 A1* | 6/2018 | Shen | H02M 1/08 |
| 2018/0242421 A1* | 8/2018 | Ohta | H05B 33/0854 |

FOREIGN PATENT DOCUMENTS

| | | |
|---|---|---|
| CN | 102195495 A | 9/2011 |
| CN | 102290989 A | 12/2011 |
| CN | 102802062 A | 11/2012 |
| CN | 204258633 U | 4/2015 |

\* cited by examiner

DC VOLTAGE CONVERSION CIRCUIT AND LIQUID CRYSTAL DISPLAY DEVICE

BACKGROUND OF THE INVENTION

Field of Invention

The present invention relates to the field of liquid crystal display, and more particularly to a dc voltage conversion circuit and a liquid crystal display device.

Description of Prior Art

With the improvement of display technology, flat panel display devices such as the liquid crystal display (LCD) has been widely used in various consumer electronic products such as mobile phones, televisions, personal digital assistants, digital cameras, notebooks, and desktop with high quality, power saving, thin body and wide application range, and has become the mainstream of the display devices.

Most of the liquid crystal display devices on the market are backlight type liquid crystal displays, each of which includes a liquid crystal display panel, a backlight module, and a circuit board. The working principle of the liquid crystal display panel is to place liquid crystal molecules between a thin film transistor array substrate (TFT array substrate) and a color filter substrate (CF substrate), and a driving voltage is applied on the two substrate for controlling the rotating direction of the liquid crystal molecules, to produce an image by refracting the light from the backlight module.

The circuit board of the liquid crystal display device generally includes a DC voltage conversion circuit for boosting or bucking the input voltage and outputting the output voltage to the electrical component. Please refer to FIG. 1, which shows a buck-type DC voltage conversion circuit, which includes a first resistor R10, a second resistor R20, a third resistor R30, a first field effect transistor Q10, a first inductor L10, a first diode D10, and a pulse width modulation chip (PWM IC) 100'. A first terminal of the first resistor R10 is connected with an input voltage Vin and a second terminal of the first resistor R10 is electrically connected with a drain electrode of the first field effect transistor Q10. A gate electrode of the first field effect transistor Q10 is connected with an output terminal of the PWM IC 100', a source electrode of the first field effect transistor Q10 is electrically connected with a first terminal of the first inductor L10. A second terminal of the first inductor L10 outputs an output voltage Vout. A cathode of the first diode D10 is electrically connected with the first terminal of the first inductor L10 and an anode of the first diode D10 is grounded. A first terminal of the second resistor R20 is electrically connected with the second terminal of the first inductor L10, a second terminal of the second resistor R20 is electrically connected with a first terminal of the third resistor R30 and outputs a feedback voltage $V_{FB}$. A second terminal of the third resistor R30 is grounded.

An input terminal of the PWM IC 100' is connected with the feedback voltage $V_{FB}$, to compare the feedback voltage $V_{FB}$ with a reference voltage, then reducing the duty cycle of the output pulse signal PWM to decrease the output voltage Vout, when the feedback voltage $V_{FB}$ is greater than the reference voltage; then increasing the duty cycle of the output pulse signal PWM to increase the output voltage Vout, when the feedback voltage $V_{FB}$ is smaller than the reference voltage, thereby controlling the output voltage Vout.

Presently, the size of TFT-LCD is increasing day by day, the current in each DC voltage conversion circuit is getting bigger and bigger, and with the increasing need for decreasing cost, the wiring length between each DC voltage conversion circuit to its corresponding electrical components is limited due to the board width of the printed circuit board. The width of wiring between a DC voltage conversion circuit to its corresponding electrical components is limited, which results in a greater resistance to the wiring. In the situation with large current, the output voltage of the DC conversion circuit will generate a large voltage drop on the wiring. The voltage received by the electrical components could not meet the requirements. For example, if the output voltage of the DC voltage conversion circuit is 1.8V, the impedance of the wiring is 0.5Ω, the current is 0.5 A, the voltage be actually input to the electrical components is only 1.55V, which could not meet the demand. If the input voltage is set higher directly, when the current is small, the voltage input to the electrical components will be too large beyond its voltage limit.

SUMMARY OF THE INVENTION

Therefore, an object of the present invention is to provide a GOA circuit for preventing clock signals from missing, which solves the problem that the display signal is damaged due to the disappearance of the clock signal.

In order to achieve the object, the present invention provides a DC voltage conversion circuit, which can ensure that the voltage received by the electrical components which are connected with the DC voltage conversion circuit is consistent, when outputting different currents, and the quality of the product is improved.

In order to achieve the object, the present invention provides a liquid crystal display device, which can ensure that the voltage received by the electrical components which are connected with the DC voltage conversion circuit is consistent, when outputting different currents, and the quality of the product is improved.

In order to achieve the object, the present invention provides a DC voltage conversion circuit, which comprises a voltage dividing unit, a voltage conversion unit, a first subtractor, an adder, a second subtractor, and a pulse width modulation unit.

An input terminal of the voltage dividing unit is connected with an input voltage and an output terminal of the voltage dividing unit is electrically connected with an input terminal of the voltage conversion unit. A first output terminal of the voltage conversion unit outputs an output voltage and a second output terminal of the voltage conversion unit outputs a feedback voltage; or An input terminal of the voltage conversion unit is connected with an input voltage, a first output terminal of the voltage conversion unit is electrically connected with an input terminal of the voltage dividing unit, and a second output terminal of the voltage conversion unit outputs a feedback voltage. An output terminal of the voltage dividing unit outputs an output voltage.

A non-inverting input terminal and an inverting input terminal of the first subtractor are respectively electrically connected with the input terminal and the output terminal of the voltage dividing unit, and the output terminal of the first subtractor is electrically connected with a non-inverting input terminal of the adder. An inverting input terminal of the adder is connected with a first reference voltage. An output terminal of the adder is electrically connected with an inverting input terminal of the second subtractor. A non-inverting input terminal of the second subtractor is connected with the feedback voltage. An output terminal of the second subtractor is electrically connected with the input terminal of the pulse width modulation unit.

The output terminal of the pulse width modulation unit is electrically connected with a control terminal of the voltage conversion unit.

The pulse width modulation unit is used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference.

The voltage dividing unit is a first resistor. A first terminal of the first resistor is the input terminal of the voltage dividing unit and a second terminal of the first resistor is the output terminal of the voltage dividing unit.

The voltage conversion unit comprises a switching element, an inductance, a second resistor, a third resistor, and a diode.

An input terminal of the switching element is the input terminal of the voltage conversion unit, the control terminal of the switching element is the control terminal of the voltage conversion unit, and an output terminal of the switching element is electrically connected with a first terminal of the inductance. A second terminal of the inductance is the first terminal of the voltage conversion unit. A cathode of the diode is electrically connected with the first terminal of the inductance and the anode of the diode is grounded. A first terminal of the second resistor is electrically connected with the second terminal of the inductance and a second terminal of the second resistor is the second output terminal of the voltage conversion unit and is electrically connected with a first terminal of the third resistor. A second terminal of the third resistor is grounded.

The switching unit is a field effect transistor. A gate electrode of the field effect transistor is the control terminal of the switching unit, a drain electrode of the field effect transistor is the input terminal of the switching unit, and a source electrode of the field effect transistor is the output terminal of the switching unit.

The field effect transistor is an N-type field effect transistor.

The pulse width modulation unit correspondingly increases the duty ratio of the pulse signal outputted from the output terminal of the pulse width modulation unit, when the voltage outputted from the output terminal of the second subtractor is smaller than the preset voltage difference. The voltage outputted from the output terminal of the voltage conversion unit and the feedback voltage are controlled to be increased until the voltage outputted from the output of the second subtractor is equal to the preset voltage difference.

The pulse width modulation unit correspondingly decreases the duty ratio of the pulse signal outputted from the output terminal of the pulse width modulation unit, when the voltage outputted from the output terminal of the second subtractor is larger than the preset voltage difference. The voltage outputted from the output terminal of the voltage conversion unit and the feedback voltage are controlled to be decreased until the voltage outputted from the output of the second subtractor is equal to the preset voltage difference.

Optionally, the field effect transistor is a P-type field effect transistor.

The pulse width modulation unit correspondingly decreases the duty ratio of the pulse signal outputted from the output terminal of the pulse width modulation unit, when the voltage outputted from the output terminal of the second subtractor is smaller than the preset voltage difference. The voltage outputted from the output terminal of the voltage conversion unit and the feedback voltage are controlled to be increased until the voltage outputted from the output of the second subtractor is equal to the preset voltage difference.

The pulse width modulation unit correspondingly increases the duty ratio of the pulse signal outputted from the output terminal of the pulse width modulation unit, when the voltage outputted from the output terminal of the second subtractor is larger than the preset voltage difference. The voltage outputted from the output terminal of the voltage conversion unit and the feedback voltage are controlled to be decreased until the voltage outputted from the output of the second subtractor is equal to the preset voltage difference.

The present invention further provides a liquid crystal display device, comprises the above DC voltage conversion circuit.

The present invention further provides a DC voltage conversion circuit, which comprises a voltage dividing unit, a voltage conversion unit, a first subtractor, an adder, a second subtractor, and a pulse width modulation unit.

An input terminal of the voltage dividing unit is connected with an input voltage and an output terminal of the voltage dividing unit is electrically connected with an input terminal of the voltage conversion unit. A first output terminal of the voltage conversion unit outputs an output voltage and a second output terminal of the voltage conversion unit outputs a feedback voltage; or An input terminal of the voltage conversion unit is connected with an input voltage, a first output terminal of the voltage conversion unit is electrically connected with an input terminal of the voltage dividing unit, and a second output terminal of the voltage conversion unit outputs a feedback voltage. An output terminal of the voltage dividing unit outputs an output voltage.

A non-inverting input terminal and an inverting input terminal of the first subtractor are respectively electrically connected with the input terminal and the output terminal of the voltage dividing unit, and the output terminal of the first subtractor is electrically connected with a non-inverting input terminal of the adder. An inverting input terminal of the adder is connected with a first reference voltage. An output terminal of the adder is electrically connected with an inverting input terminal of the second subtractor. A non-inverting input terminal of the second subtractor is connected with the feedback voltage. An output terminal of the second subtractor is electrically connected with the input terminal of the pulse width modulation unit.

The output terminal of the pulse width modulation unit is electrically connected with a control terminal of the voltage conversion unit.

The pulse width modulation unit is used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference.

Wherein the voltage dividing unit is a first resistor. A first terminal of the first resistor is the input terminal of the voltage dividing unit and a second terminal of the first resistor is the output terminal of the voltage dividing unit.

Wherein the voltage conversion unit comprises a switching element, an inductance, a second resistor, a third resistor, and a diode.

An input terminal of the switching element is the input terminal of the voltage conversion unit, the control terminal of the switching element is the control terminal of the voltage conversion unit, and an output terminal of the switching element is electrically connected with a first terminal of the inductance. A second terminal of the inductance is the first terminal of the voltage conversion unit. A cathode of the diode is electrically connected with the first terminal of the inductance and the anode of the diode is grounded. A first terminal of the second resistor is electrically connected with the second terminal of the inductance and a second terminal of the second resistor is the second output terminal of the voltage conversion unit and is electrically connected with a first terminal of the third resistor. A second terminal of the third resistor is grounded.

Wherein the switching unit is a field effect transistor. A gate electrode of the field effect transistor is the control terminal of the switching unit, a drain electrode of the field effect transistor is the input terminal of the switching unit, and a source electrode of the field effect transistor is the output terminal of the switching unit.

Wherein the field effect transistor is an N-type field effect transistor.

The beneficial effects of the present invention are: the present invention provides a DC voltage conversion circuit comprises a voltage dividing unit, a voltage conversion unit, a first subtractor, an adder, a second subtractor, and a pulse width modulation unit. The pulse width modulation unit is used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference. So as to increase the output voltage when the output current of the DC voltage conversion circuit is increased, and reduce the output voltage when the output current is decreased, and can ensure that the voltage received by the connected electrical components is consistent and the quality of the product is improved. A liquid crystal display device provided by the present invention, which comprises the above DC voltage conversion circuit, which can ensure that the voltage received by the electrical components which are connected with the DC voltage conversion circuit is consistent and the good quality of the product.

BRIEF DESCRIPTION OF THE DRAWINGS

For better understanding the technical proposals and other beneficial effects of the present invention, please refer the following detailed description of the present invention with the accompanying drawings.

In drawings.

DETAILED DESCRIPTION OF THE PREFERRED EMBODIMENTS

The technical means and the effects thereof will be further described with reference to the preferred embodiments of the present invention and their accompanying drawings.

Figure 1:
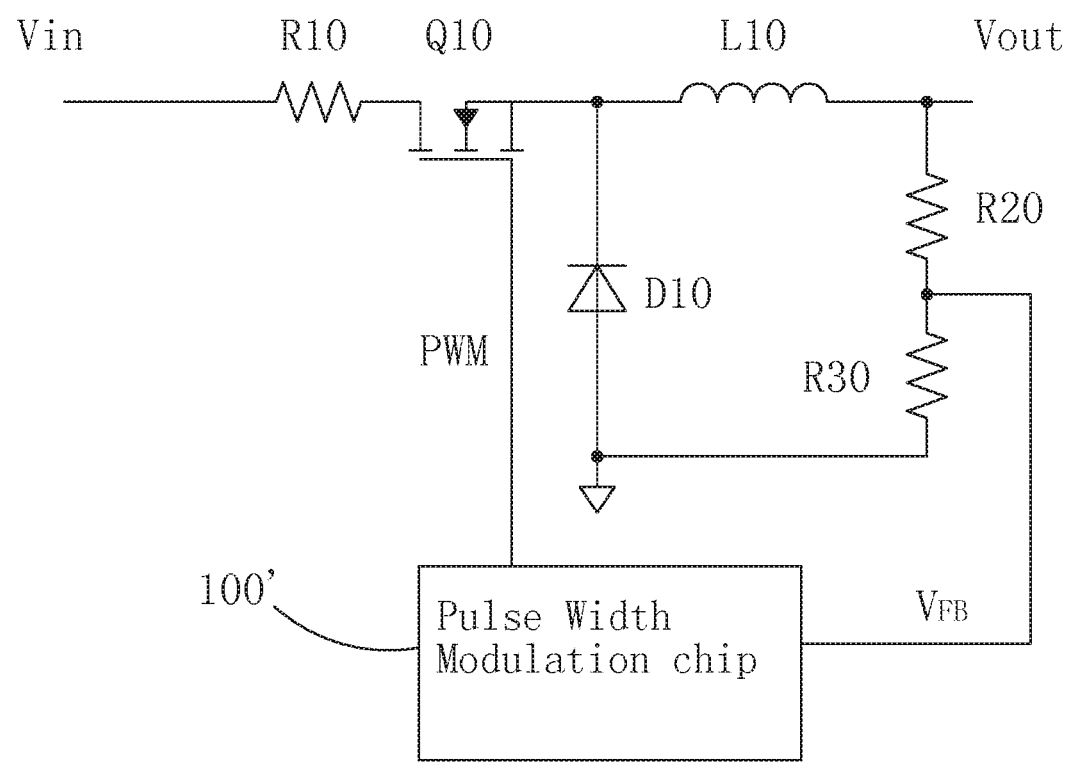
FIG. 1 is a circuit diagram of a buck-type DC voltage conversion circuit according to the conventional art.
Figure 2:
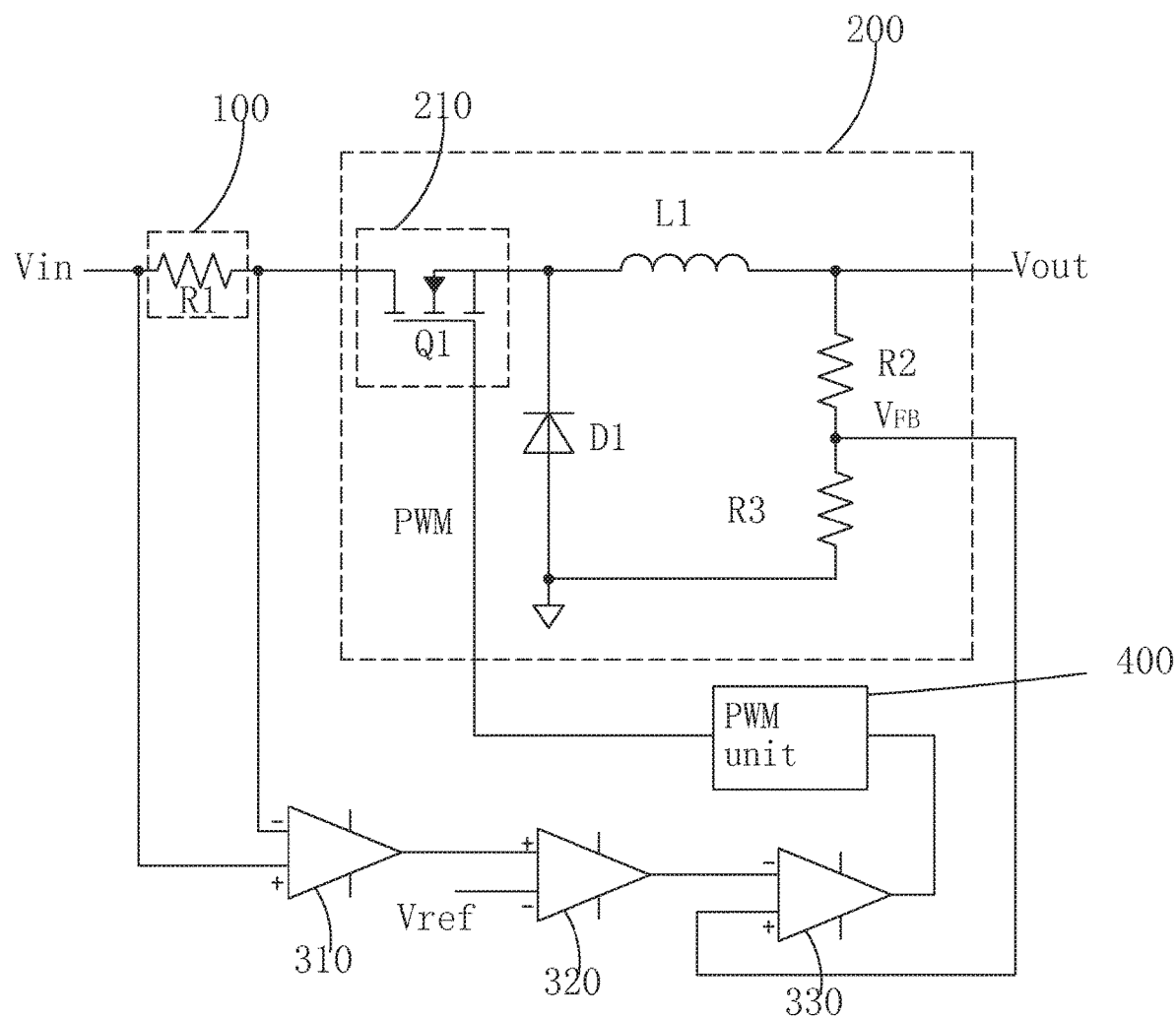
FIG. 2 is a circuit diagram of a DC voltage conversion circuit of a first embodiment according to the present invention.

The present invention provides a DC voltage conversion circuit; please refer to FIG. 2, which is a circuit diagram of a DC voltage conversion circuit of a first embodiment according to the present invention. The DC voltage conversion circuit comprises a voltage dividing unit 100, a voltage conversion unit 200, a first subtractor 310, an adder 320, a second subtractor 330, and a pulse width modulation unit 400.

In the embodiment, an input terminal of the voltage dividing unit 100 is connected with an input voltage Vin and an output terminal of the voltage dividing unit 100 is electrically connected with an input terminal of the voltage conversion unit 200. A first output terminal of the voltage conversion unit 200 outputs an output voltage Vout and a second output terminal of the voltage conversion unit 200 outputs a feedback voltage $V_{FB}$.

A non-inverting input terminal and an inverting input terminal of the first subtractor 310 are respectively electrically connected with the input terminal and the output terminal of the voltage dividing unit 100, and the output terminal of the first subtractor 310 is electrically connected with a non-inverting input terminal of the adder 320. An inverting input terminal of the adder 320 is connected with a first reference voltage Vref. An output terminal of the adder 320 is electrically connected with an inverting input terminal of the second subtractor 330. A non-inverting input terminal of the second subtractor 330 is connected with the feedback voltage $V_{FB}$. An output terminal of the second subtractor 330 is electrically connected with the input terminal of the pulse width modulation unit 400.

The output terminal of the pulse width modulation unit 400 is electrically connected with a control terminal of the voltage conversion unit 200.

The pulse width modulation unit 400 is used for correspondingly adjusting the duty ratio of the pulse signal PWM outputted from the pulse width modulation unit 400 when a voltage outputted from the output terminal of the second subtractor 330 is smaller than or greater than a preset voltage difference, Specifically, in the embodiment, the voltage dividing unit 100 is a first resistor R1. A first terminal of the first resistor R1 is the input terminal of the voltage dividing unit 100 and a second terminal of the first resistor R1 is the output terminal of the voltage dividing unit 100. Of course, the voltage dividing unit 100 may also use multiple resistors in parallel, in series, or with other components having a voltage dividing function depending on the particular product requirements, which does not affect the implementation of the present invention.

Specifically, the voltage conversion unit 200 comprises a switching element 210, an inductance L1, a second resistor R2, a third resistor R3, and a diode D1.

An input terminal of the switching element 210 is the input terminal of the voltage conversion unit 200, the control terminal of the switching element 210 is the control terminal of the voltage conversion unit 200, and an output terminal of the switching element 210 is electrically connected with a first terminal of the inductance L1. A second terminal of the inductance L1 is the first terminal of the voltage conversion unit 200. A cathode of the diode D1 is electrically connected with the first terminal of the inductance L1 and the anode of the diode D1 is grounded. A first terminal of the second resistor R2 is electrically connected with the second terminal of the inductance L1, a second terminal of the second resistor R2 is the second output terminal of the voltage conversion unit 200 and is electrically connected with a first terminal of the third resistor R3. A second terminal of the third resistor R3 is grounded.

It is to be noted that the output voltage Vout of the DC voltage conversion circuit is input to the electrical components. Because the non-inverting and inverting input terminals of the first subtractor 310 are electrically connected with the input terminal and the output terminal of the voltage dividing unit 100, the voltage outputted from the output terminal of the first subtractor 310 is a voltage difference across the two terminal of the voltage dividing unit 100; and, the inverting input terminal of the adder 320 is connected with the first reference voltage Vref and the non-inverting input terminal of the adder 320 is connected with the voltage outputted from the output terminal of the first subtractor 310, so the voltage outputted from the output terminal of the adder 320 is a voltage sum between the first reference voltage Vref and the voltage difference across the two terminal of the voltage dividing unit 100; the non-inverting input terminal of the second subtractor 330 is connected with the feedback voltage $V_{FB}$, and the inverting input terminal of the second subtractor 330 is connected with the output terminal of the adder 320, so the voltage outputted from the output terminal of the second subtractor is a sum of the feedback voltage $V_{FB}$ minus the first reference voltage Vref and the voltage difference across the two terminal of the voltage dividing unit 100. When the current output by the DC voltage conversion circuit is increased, the current flowing through the voltage dividing unit 100 is increased, and the voltage difference across the two terminals of the voltage dividing unit 100 is increased, that is, the voltage outputted from the output terminal of the first subtractor 310 is increased, and the sum of the first reference voltage Vref and voltage difference across the two terminal of the voltage dividing unit 100 is correspondingly increased, that is, the voltage outputted from the output terminal of the adder 320 is increased, and the sum of the feedback voltage $V_{FB}$ minus the first reference voltage Vref and the voltage difference across the two sides of the first reference voltage Vref and the voltage dividing unit 100 is reduced, that is, the voltage outputted from the output terminal of the second subtractor 330 is reduced, so that the voltage outputted from the output terminal of the second subtractor 330 is smaller than the preset voltage difference. At this time, the pulse width modulation unit 400 adjusts the duty ratio of the pulse signal PWM outputted from its output terminal according to that the voltage outputted from the output terminal of the second subtractor 330 is smaller than the preset voltage difference, and controls the voltage outputted from the output terminal of the voltage conversion unit 200 to be correspondingly increased, this can compensate the voltage drop of the wiring when the output voltage outputted from the DC voltage conversion circuit passing through the electrical components, when the current outputted from the DC voltage conversion circuit output is increased, to ensure that the voltage inputted to the electrical components is met the demand voltage of the electrical components. At the same time, since the voltage outputted from the output terminal of the voltage conversion unit 200 is increased, the feedback voltage $V_{FB}$ also be increased, and the voltage outputted from the output terminal of the second subtractor 330 is gradually become the preset voltage difference. The pulse width adjustment unit 400 controls the duty cycle of the pulse signal PWM to be unchanged. When the current output by the DC voltage conversion circuit is decreased, the current flowing through the voltage dividing unit 100 is decreased, and the voltage difference across the two terminals of the voltage dividing unit 100 is decreased, that is, the voltage outputted from the output terminal of the first subtractor 310 is decreased, and the sum of the first reference voltage Vref and voltage difference across the two terminal of the voltage dividing unit 100 is correspondingly decreased, that is, the voltage outputted from the output terminal of the adder 320 is decreased, and a difference between the feedback voltage $V_{FB}$ and the voltage difference across the two sides of the first reference voltage Vref and the voltage dividing unit 100 is increased, that is, the voltage outputted from the output terminal of the second subtractor 330 is increased, so that the voltage outputted from the output terminal of the second subtractor 330 is larger than the preset voltage difference. At this time, the pulse width modulation unit 400 adjusts the duty ratio of the pulse signal PWM outputted from its output terminal according to that the voltage outputted from the output terminal of the second subtractor 330 is larger than the preset voltage difference, and controls the voltage outputted from the output terminal of the voltage conversion unit 200 to be correspondingly decreased. It is possible to prevent the output voltage Vout outputted from the DC voltage conversion circuit being larger than the demand voltage of the electric components from burning the electrical components after inputting to the electric components. At the same time, since the voltage outputted from the output terminal of the voltage conversion unit 200 is decreased, the feedback voltage $V_{FB}$ also be increased, and the voltage outputted from the output terminal of the second subtractor 330 is gradually become the preset voltage difference. The pulse width adjustment unit 400 controls the duty cycle of the pulse signal PWM to be unchanged.

Specifically, the switching unit 210 is a field effect transistor Q1. A gate electrode of the field effect transistor Q1 is the control terminal of the switching unit 210, a drain electrode of the field effect transistor Q1 is the input terminal of the switching unit 210, and a source electrode of the field effect transistor Q1 is the output terminal of the switching unit 210. Of course, the switching unit 210 may employ other elements such as a thin film transistor.

Furthermore, the field effect transistor Q1 is an N-type field effect transistor. The pulse width modulation unit 400 correspondingly increases the duty ratio of the pulse signal PWM outputted from the output terminal of the pulse width modulation unit 400, when the voltage outputted from the output terminal of the second subtractor 330 is smaller than the preset voltage difference. The voltage outputted from the output terminal of the voltage conversion unit 200 and the feedback voltage $V_{FB}$ are controlled to be increased until the voltage outputted from the output of the second subtractor 330 is equal to the preset voltage difference. The pulse width modulation unit 400 correspondingly decreases the duty ratio of the pulse signal PWM outputted from the output terminal of the pulse width modulation unit 400, when the voltage outputted from the output terminal of the second subtractor 330 is larger than the preset voltage difference. The voltage outputted from the output terminal of the voltage conversion unit 200 and the feedback voltage $V_{FB}$ are controlled to be decreased until the voltage outputted from the output of the second subtractor 330 is equal to the preset voltage difference.

Of course, in other embodiments of the present invention, the field effect transistor Q1 may choose a P-type field effect transistor. The pulse width modulation unit 400 correspondingly decreases the duty ratio of the pulse signal PWM outputted from the output terminal of the pulse width modulation unit 400, when the voltage outputted from the output terminal of the second subtractor 330 is smaller than the preset voltage difference. The voltage outputted from the output terminal of the voltage conversion unit 200 and the feedback voltage $V_{FB}$ are controlled to be increased until the voltage outputted from the output of the second subtractor 330 is equal to the preset voltage difference. The pulse width modulation unit 400 correspondingly increases the duty ratio of the pulse signal PWM outputted from the output terminal of the pulse width modulation unit 400, when the voltage outputted from the output terminal of the second subtractor 330 is larger than the preset voltage difference. The voltage outputted from the output terminal of the voltage conversion unit 200 and the feedback voltage V are controlled to be decreased until the voltage outputted from the output of the second subtractor 330 is equal to the preset voltage difference.

Figure 3:
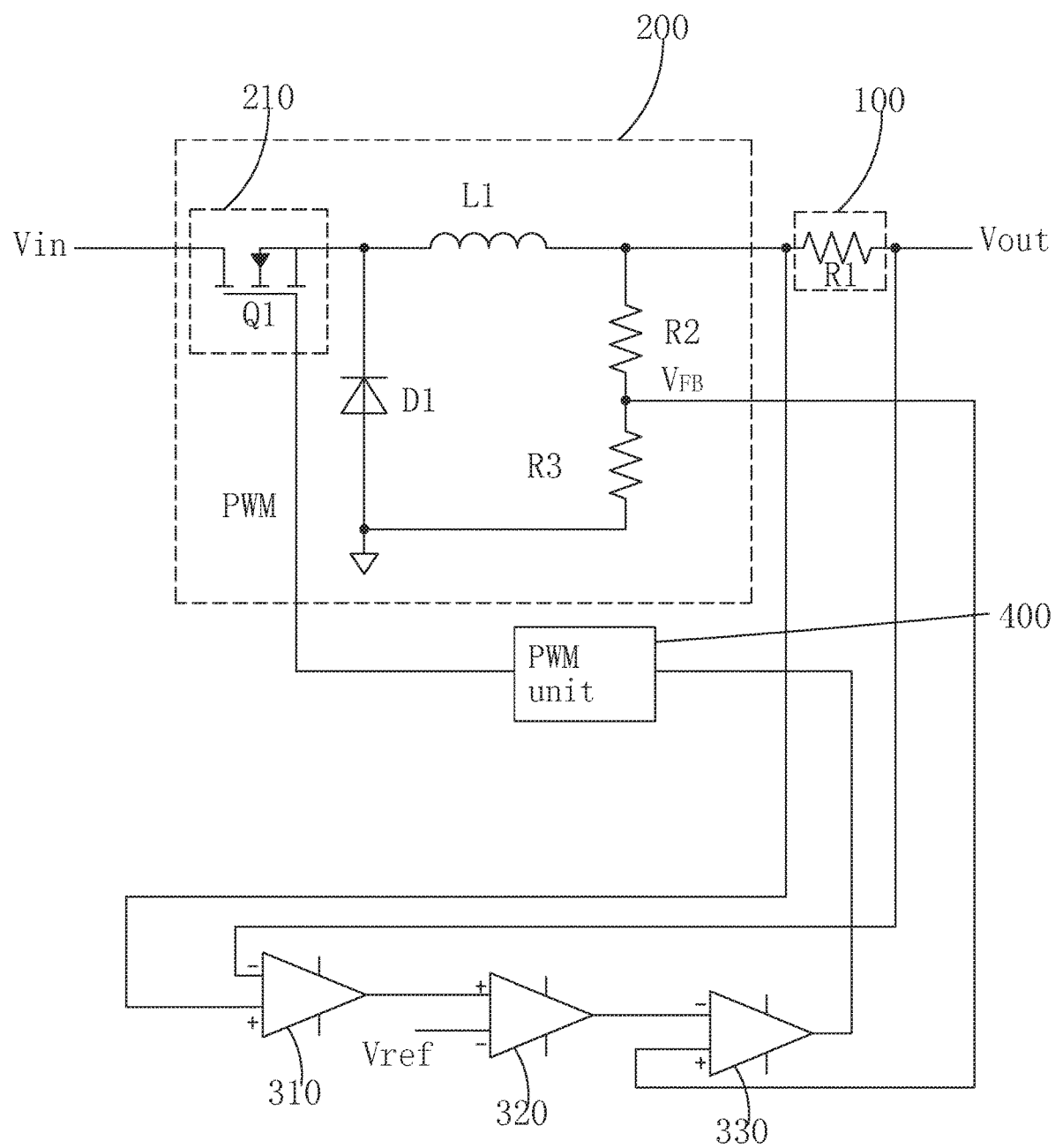
FIG. 3 is a circuit diagram of a DC voltage conversion circuit of a second embodiment according to the present invention.

Please refer to FIG. 3, which is a circuit diagram of a DC voltage conversion circuit of a second embodiment according to the present invention. The differences between the present embodiment and the first embodiment are: an input terminal of the voltage conversion unit 200 is connected with an input voltage Vin, a first output terminal of the voltage conversion unit 200 is electrically connected with an input terminal of the voltage dividing unit 100, and a second output terminal of the voltage conversion unit 200 outputs a feedback voltage $V_{FB}$. An output terminal of the voltage dividing unit 100 outputs an output voltage Vout. Others are the same as the first embodiment, no more description is addressed. In the second embodiment, the input terminal of the voltage dividing unit 100 is electrically connected with the first output terminal of the voltage conversion unit 200; the output terminal of the voltage dividing unit 100 is outputted with the output voltage Vout. Hence, when the current outputted from the DC voltage conversion circuit is increased or decreased, the current flowing through the voltage dividing unit 100 is correspondingly increased or decreased, the voltage outputted from the output terminal of the first subtractor 310 is correspondingly increased or decreased, and the voltage outputted from the output terminal of the adder 320 is correspondingly increased or decreased. Hence, the voltage outputted from the output terminal of the second subtractor 330 is correspondingly decreased or increased so as to be smaller than or greater than the preset voltage difference. The pulse width modulation unit 400 is used for correspondingly adjusting the duty ratio of the pulse signal PWM outputted from the pulse width modulation unit 400 when a voltage outputted from the output terminal of the second subtractor 330 is smaller than or greater than a preset voltage difference, then the voltage outputted from the output terminal of the voltage conversion unit 200 and the feedback voltage V are controlled to be increased until the voltage outputted from the output of the second subtractor 330 is equal to the preset voltage difference. To ensure that the voltage received by the electrical components which are connected with the DC voltage conversion circuit is consistent.

Based on the same inventive concept, the present invention further provides a liquid crystal display device, which comprises the above DC voltage conversion circuit, which can ensure that the voltage received by the electrical components which are connected with the DC voltage conversion circuit is consistent, when outputting different currents, and the quality of the good quality of the product. The DC voltage conversion circuit is no longer described here.

As mentioned above, the DC voltage conversion circuit of the present invention comprises a voltage dividing unit, a voltage conversion unit, a first subtractor, an adder, a second subtractor, and a pulse width modulation unit. The pulse width modulation unit is used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference. So as to increase the output voltage when the output current of the DC voltage conversion circuit is increased, and reduce the output voltage when the output current is decreased, and can ensure that the voltage received by the connected electrical components is consistent and the quality of the product is improved. The liquid crystal display device of the present invention comprises the above DC voltage conversion circuit, which can ensure that the voltage received by the electrical components which are connected with the DC voltage conversion circuit is consistent and the good quality of the product.

As mentioned above, those of ordinary skill in the art, without departing from the spirit and scope of the present invention, can make various kinds of modifications and variations to the present invention. Therefore, all such modifications and variations are intended to be included in the protection scope of the appended claims of the present invention.

What is claimed is:

1. A DC voltage conversion circuit, comprising a voltage dividing unit, a voltage conversion unit, a first subtractor, an adder, a second subtractor, and a pulse width modulation unit;

an input terminal of the voltage dividing unit being connected with an input voltage, an output terminal of the voltage dividing unit being electrically connected with an input terminal of the voltage conversion unit, a first output terminal of the voltage conversion unit outputting an output voltage, and a second output terminal of the voltage conversion unit outputting a feedback voltage; or an input terminal of the voltage conversion unit being connected with an input voltage, a first output terminal of the voltage conversion unit being electrically connected with an input terminal of the voltage dividing unit, a second output terminal of the voltage conversion unit outputting a feedback voltage, and an output terminal of the voltage dividing unit outputs an output voltage;

a non-inverting input terminal and an inverting input terminal of the first subtractor being respectively electrically connected with the input terminal and the output terminal of the voltage dividing unit, and the output terminal of the first subtractor being electrically connected with a non-inverting input terminal of the adder; an inverting input terminal of the adder being connected with a first reference voltage, an output terminal of the adder being electrically connected with an inverting input terminal of the second subtractor; a non-inverting input terminal of the second subtractor being connected with the feedback voltage, an output terminal of the second subtractor being electrically connected with the input terminal of the pulse width modulation unit, wherein the inverting input terminal and the non-inverting input terminal of the second subtractor respectively receive a first signal and a second signal that are respectively determined according to a variable signal from the voltage dividing unit and a variable signal from the voltage conversion unit that is connected to the voltage dividing unit;

the output terminal of the pulse width modulation unit being electrically connected with a control terminal of the voltage conversion unit;

the pulse width modulation unit being used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference.

2. The DC voltage conversion circuit according to claim 1, wherein the voltage dividing unit is a first resistor, a first terminal of the first resistor is the input terminal of the voltage dividing unit, and a second terminal of the first resistor is the output terminal of the voltage dividing unit.

3. The DC voltage conversion circuit according to claim 1, wherein the voltage conversion unit comprises a switching element, an inductance, a second resistor, a third resistor, and a diode;

an input terminal of the switching element is the input terminal of the voltage conversion unit, the control terminal of the switching element is the control terminal of the voltage conversion unit, an output terminal of the switching element is electrically connected with a first terminal of the inductance; a second terminal of the inductance is the first terminal of the voltage conversion unit; a cathode of the diode is electrically connected with the first terminal of the inductance, the anode of the diode is grounded; a first terminal of the second resistor is electrically connected with the second terminal of the inductance, a second terminal of the second resistor is the second output terminal of the voltage conversion unit and is electrically connected with a first terminal of the third resistor; a second terminal of the third resistor is grounded.

4. The DC voltage conversion circuit according to claim 3, wherein the switching unit is a field effect transistor, a gate electrode of the field effect transistor is the control terminal of the switching unit, a drain electrode of the field effect transistor is the input terminal of the switching unit, and a source electrode of the field effect transistor is the output terminal of the switching unit.

5. The DC voltage conversion circuit according to claim 4, wherein the field effect transistor is an N-type field effect transistor.

6. The DC voltage conversion circuit according to claim 5, wherein the pulse width modulation unit correspondingly increases the duty ratio of the pulse signal outputted from the output terminal of the pulse width modulation unit, when the voltage outputted from the output terminal of the second subtractor is smaller than the preset voltage difference, the voltage outputted from the output terminal of the voltage conversion unit and the feedback voltage are controlled to be increased until the voltage outputted from the output of the second subtractor is equal to the preset voltage difference;

the pulse width modulation unit correspondingly decreases the duty ratio of the pulse signal outputted from the output terminal of the pulse width modulation unit, when the voltage outputted from the output terminal of the second subtractor is larger than the preset voltage difference, the voltage outputted from the output terminal of the voltage conversion unit and the feedback voltage are controlled to be decreased until the voltage outputted from the output of the second subtractor is equal to the preset voltage difference.

7. The DC voltage conversion circuit according to claim 4, wherein the field effect transistor is a P-type field effect transistor.

8. The DC voltage conversion circuit according to claim 7, wherein the pulse width modulation unit correspondingly decreases the duty ratio of the pulse signal outputted from the output terminal of the pulse width modulation unit, when the voltage outputted from the output terminal of the second subtractor is smaller than the preset voltage difference, the voltage outputted from the output terminal of the voltage conversion unit and the feedback voltage are controlled to be increased until the voltage outputted from the output of the second subtractor is equal to the preset voltage difference;

the pulse width modulation unit correspondingly increases the duty ratio of the pulse signal outputted from the output terminal of the pulse width modulation unit, when the voltage outputted from the output terminal of the second subtractor is larger than the preset voltage difference, the voltage outputted from the output terminal of the voltage conversion unit and the feedback voltage are controlled to be decreased until the voltage outputted from the output of the second subtractor is equal to the preset voltage difference.

9. A liquid crystal display device, comprising the DC voltage conversion circuit according to claim 1.

10. A DC voltage conversion circuit, comprising a voltage dividing unit, a voltage conversion unit, a first subtractor, an adder, a second subtractor, and a pulse width modulation unit;

an input terminal of the voltage dividing unit being connected with an input voltage, an output terminal of the voltage dividing unit being electrically connected with an input terminal of the voltage conversion unit, a first output terminal of the voltage conversion unit outputting an output voltage, and a second output terminal of the voltage conversion unit outputting a feedback voltage; or an input terminal of the voltage conversion unit being connected with an input voltage, a first output terminal of the voltage conversion unit being electrically connected with an input terminal of the voltage dividing unit, a second output terminal of the voltage conversion unit outputting a feedback voltage, and an output terminal of the voltage dividing unit outputs an output voltage;

a non-inverting input terminal and an inverting input terminal of the first subtractor being respectively electrically connected with the input terminal and the output terminal of the voltage dividing unit, and the output terminal of the first subtractor being electrically connected with a non-inverting input terminal of the adder; an inverting input terminal of the adder being connected with a first reference voltage, an output terminal of the adder being electrically connected with an inverting input terminal of the second subtractor; a non-inverting input terminal of the second subtractor being connected with the feedback voltage, an output terminal of the second subtractor being electrically connected with the input terminal of the pulse width modulation unit, wherein the inverting input terminal and the non-inverting input terminal of the second subtractor respectively receive a first signal and a second signal that are respectively determined according to a variable signal from the voltage dividing unit and a variable signal from the voltage conversion unit that is connected to the voltage dividing unit;

the output terminal of the pulse width modulation unit being electrically connected with a control terminal of the voltage conversion unit;

the pulse width modulation unit being used for correspondingly adjusting the duty ratio of the pulse signal outputted when a voltage outputted from the output terminal of the second subtractor is smaller than or greater than a preset voltage difference, and the output voltage and the feedback voltage are increased or decreased until the voltage outputted from the second subtractor output is equal to the preset voltage difference;

wherein the voltage dividing unit is a first resistor, a first terminal of the first resistor is the input terminal of the voltage dividing unit, and a second terminal of the first resistor is the output terminal of the voltage dividing unit;

wherein the voltage conversion unit comprises a switching element, an inductance, a second resistor, a third resistor, and a diode;

an input terminal of the switching element is the input terminal of the voltage conversion unit, the control terminal of the switching element is the control terminal of the voltage conversion unit, an output terminal of the switching element is electrically connected with a first terminal of the inductance; a second terminal of the inductance is the first terminal of the voltage conversion unit; a cathode of the diode is electrically connected with the first terminal of the inductance, the anode of the diode is grounded; a first terminal of the second resistor is electrically connected with the second terminal of the inductance, a second terminal of the second resistor is the second output terminal of the voltage conversion unit and is electrically connected with a first terminal of the third resistor; a second terminal of the third resistor is grounded;

wherein the switching unit is a field effect transistor, a gate electrode of the field effect transistor is the control terminal of the switching unit, a drain electrode of the field effect transistor is the input terminal of the switching unit, and a source electrode of the field effect transistor is the output terminal of the switching unit;

wherein the field effect transistor is an N-type field effect transistor.

11. The DC voltage conversion circuit according to claim 10, wherein the pulse width modulation unit correspondingly increases the duty ratio of the pulse signal outputted from the output terminal of the pulse width modulation unit, when the voltage outputted from the output terminal of the second subtractor is smaller than the preset voltage difference, the voltage outputted from the output terminal of the voltage conversion unit and the feedback voltage are controlled to be increased until the voltage outputted from the output of the second subtractor is equal to the preset voltage difference;

the pulse width modulation unit correspondingly decreases the duty ratio of the pulse signal outputted from the output terminal of the pulse width modulation unit, when the voltage outputted from the output terminal of the second subtractor is larger than the preset voltage difference, the voltage outputted from the output terminal of the voltage conversion unit and the feedback voltage are controlled to be decreased until the voltage outputted from the output of the second subtractor is equal to the preset voltage difference.

\* \* \* \* \*